US012761935B2

(12) United States Patent

Shen et al.

(10) Patent No.: US 12,761,935 B2
(45) Date of Patent: Oct. 13, 2026

(54) BUDGET-BASED TIME SLICE ASSIGNMENT FOR MULTIPLE VIRTUAL FUNCTIONS

(71) Applicants: ADVANCED MICRO DEVICES, INC., Santa Clara, CA (US); ATI TECHNOLOGIES ULC, Markham (CA)

(72) Inventors: Yuping Shen, Orlando, FL (US); Min Zhang, Toronto (CA); Yinan Jiang, Richmond Hill (CA); Jeffrey G. Cheng, Markham (CA)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 501 days.

(21) Appl. No.: 18/088,962

(22) Filed: Dec. 27, 2022

(65) Prior Publication Data

US 2024/0211291 A1 Jun. 27, 2024

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01)

(58) Field of Classification Search
CPC .................................................. G06F 9/45558
USPC ............................................................. 718/1
See application file for complete search history.

(56) References Cited

U.S. PATENT DOCUMENTS

| | | | | |
|---|---|---|---|---|
| 2010/0100888 | A1* | 4/2010 | Tene | G06F 9/5077 714/6.32 |
| 2012/0229481 | A1 | 9/2012 | Mccrary et al. | |
| 2014/0173614 | A1 | 6/2014 | Konick et al. | |
| 2014/0229941 | A1 | 8/2014 | Bert et al. | |
| 2014/0245300 | A1 | 8/2014 | Clegg et al. | |
| 2015/0046923 | A1 | 2/2015 | Kruglick | |
| 2015/0178135 | A1 | 6/2015 | Wang | |
| 2016/0147685 | A1* | 5/2016 | Check | G06F 13/372 710/117 |
| 2016/0162316 | A1* | 6/2016 | King | G06F 13/28 718/1 |
| 2018/0113731 | A1* | 4/2018 | Cheng | G06F 9/45558 |
| 2018/0165111 | A1* | 6/2018 | Feng | G06F 9/505 |
| 2019/0004839 | A1* | 1/2019 | Cheng | G06F 9/50 |
| 2019/0287205 | A1 | 9/2019 | Ramadoss et al. | |
| 2019/0317802 | A1 | 10/2019 | Bachmutsky et al. | |

(Continued)

OTHER PUBLICATIONS

U.S. Appl. No. 18/072,818, filed Dec. 1, 2022, listing Ahmed M. Abdelkhalek et al. as inventors, entitled "Job Limit Enforcement for Improved Multitenant Quality of Service", 26 pages.

(Continued)

*Primary Examiner* — Mehran Kamran

(57) ABSTRACT

A host processing system assigns unequal time slices at a parallel processor to virtual functions based on profiles of applications executing at the virtual functions and an available budget of the parallel processor. The host processing system calculates a world switch cycle interval and assesses an available processing budget of the parallel processor. The available budget indicates the amount of graphics processing time the parallel processor has not yet allocated to virtual functions for each world switch cycle interval.

18 Claims, 5 Drawing Sheets

(56) References Cited

U.S. PATENT DOCUMENTS

| | | | | |
|---|---|---|---|---|
| 2020/0135151 | A1* | 4/2020 | Jiang | G06F 1/24 |
| 2020/0174842 | A1* | 6/2020 | Wang | H04L 67/63 |
| 2020/0334064 | A1 | 10/2020 | Jiang et al. | |
| 2020/0366682 | A1* | 11/2020 | Aggarwal | H04L 63/105 |
| 2020/0409732 | A1* | 12/2020 | Kovacevic | G06F 9/4881 |
| 2021/0019085 | A1 | 1/2021 | Zhu et al. | |
| 2021/0064405 | A1* | 3/2021 | Ashkar | G06F 9/45558 |
| 2021/0272229 | A1 | 9/2021 | Mccrary | |
| 2021/0279107 | A1* | 9/2021 | Qu | G06F 9/45558 |
| 2021/0279247 | A1 | 9/2021 | Kumar et al. | |
| 2021/0398243 | A1* | 12/2021 | Shah | G06F 9/45558 |
| 2022/0058048 | A1 | 2/2022 | Jiang et al. | |
| 2023/0008176 | A1 | 1/2023 | Sedaghat et al. | |
| 2023/0297526 | A1 | 9/2023 | Puffer et al. | |
| 2024/0211290 | A1* | 6/2024 | Shen | G06F 9/45545 |
| 2024/0211291 | A1* | 6/2024 | Shen | G06F 9/5077 |

OTHER PUBLICATIONS

U.S. Appl. No. 18/085,902, filed Dec. 21, 2022, listing Ahmed M. Abdelkhalek et al. as inventors, entitled "Multi-Level Scheduling for Improved Quality of Service", 33 pages.

U.S. Appl. No. 18/088,955, filed Dec. 27, 2022, listing Yuping Shen et al. as inventors, entitled "Job Submission Alignment With World Switch", 28 pages.

International Search Report and Written Opinion issued in Application No. PCT/US2023/085611, mailed Apr. 25, 2024, 11 pages.

International Preliminary Report on Patentability mailed Jul. 10, 2025 for PCT/US2023/085611, 8 pages.

International Search Report and Written Opinion mailed Apr. 24, 2024 for PCT/US2023/085176, 8 pages.

International Preliminary Report on Patentability mailed Jul. 3, 2025 for PCT/US2023/085176, 5 pages.

Non-Final Office Action Mailed Jun. 13, 2024 for U.S. Appl. No. 18/072,818, 12 pages.

Final Office Action Mailed Oct. 1, 2024 for U.S. Appl. No. 18/072,818, 11 pages.

Notice of Allowance mailed Mar. 10, 2025 for U.S. Appl. No. 18/072,818, 7 pages.

Non-Final Office Action Mailed Jul. 9, 2025 for U.S. Appl. No. 18/085,902, 18 pages.

Non-Final Office Action mailed Jan. 29, 2026 for U.S. Appl. No. 18/085,902, 24 pages.

* cited by examiner

BUDGET-BASED TIME SLICE ASSIGNMENT FOR MULTIPLE VIRTUAL FUNCTIONS

BACKGROUND

Processing units such as graphics processing units (GPUs) and other parallel processors support virtualization that allows multiple virtual machines to use the hardware resources of the GPU. Each virtual machine executes as a separate process that uses the hardware resources of the GPU. Some virtual machines implement an operating system that allows the virtual machine to emulate an actual machine. Other virtual machines are designed to execute code in a platform-independent environment. A hypervisor creates and runs the virtual machines, which are also referred to as guest machines or guests. The virtual environment implemented on the GPU provides virtual functions to other virtual components implemented on a physical machine. A single physical function implemented in the GPU is used to support one or more virtual functions. Using temporal partitioning, the physical function allocates the virtual functions to different virtual machines on the physical machine on a time-sliced basis. The single root input/output virtualization (SR-IOV) specification allows multiple virtual machines (VMs) to share a GPU interface to a single bus, such as a peripheral component interconnect express (PCIe) bus. Components access the virtual functions by transmitting requests over the bus.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
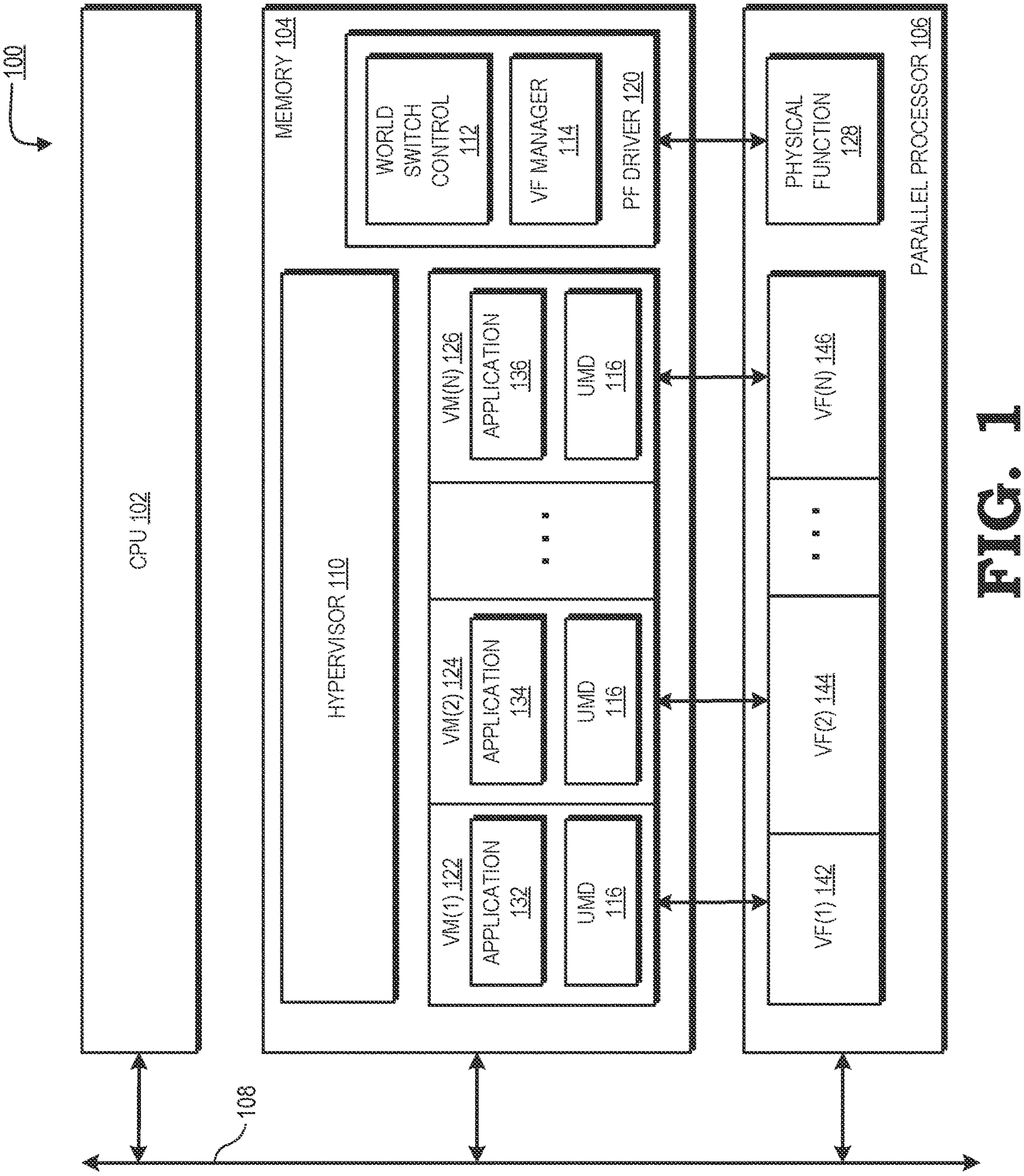
FIG. 1 is a block diagram of a processing system configured to assign time slices at a parallel processor to virtual functions based on profiles of applications executing at the virtual functions and an available budget of the parallel processor in accordance with some embodiments.

Temporal partition-based SR-IOV solutions typically configure virtual functions sharing a parallel processor identically, with uniform time slices and memory allocations across all virtual functions. Although allocating time slices and memory identically across virtual functions provides fairness and simple cost management, identical allocations can lead to increased latency and underutilization of the parallel processor in some circumstances.

For example, if a uniform time slice has a duration that is shorter than a rendering time for a frame of an application running at a virtual function, the parallel processor will not complete rendering the frame in a single time slice. When the time slice ends, a world switch preempts the virtual function and switches use of the parallel processor to the next virtual function. Only after a world switch interval cycle has completed and the virtual function regains the parallel processor does rendering of the frame continue. Thus, the rendering time for the frame exceeds not only the time slice but also the world switch interval cycle, leading to increased latency and lagging which could negatively impact the user experience. Conversely, if the world switch interval cycle is evenly divided among a smaller number of virtual functions such that each time slice is longer and can accommodate longer rendering times, in some cases the time slice will be longer than the rendering time, resulting in underutilization of the parallel processor.

FIGS. 1-5 illustrate systems and techniques for assigning time slices at a parallel processor of a host processing system to virtual functions based on profiles of applications executing at the virtual functions and an available budget of the parallel processor. A physical function driver for the parallel processor calculates a world switch cycle interval and assesses an available processing budget of the parallel processor (referred to herein as the "available budget"). The available budget indicates the amount of graphics processing time the parallel processor has not yet allocated to virtual functions for each world switch cycle interval. In some embodiments, the available budget is based on a target frame rate for each virtual function configured for the processing system. For example, if the target frame rate is 60 frames per second (fps), in some embodiments the host sets the world switch cycle to 1000/60 fps=16.67 ms. Thus, the available budget before any time slices have been allocated to virtual functions is 16.67 ms.

A virtual function manager (VF manager) at the physical function driver evaluates requests from virtual functions for time slices at the parallel processor in the order in which the requests are received. Each request includes a profile of an application running at the virtual function indicating a budget requirement of the application. For example, the profile of an application indicates an amount of rendering time per frame for the application in some embodiments. The VF manager selectively assigns a first time slice to a first virtual function based on the available budget and the profile of the application executing at the first virtual function. Thus, in a first example, if the available budget is 100% of the world switch cycle interval and the profile of the application executing at the first virtual function indicates that the application requires 20% of the world switch cycle interval to render each frame, the VF manager assigns a time slice that is 20% of the world switch cycle interval to the first virtual function and subtracts the assigned time slice to calculate an updated current available budget of 80% of the world switch cycle interval.

In response to a request from a second virtual function for a time slice, the VF manager selectively assigns a second time slice based on the updated current available budget and a profile of an application executing at the second virtual function. Thus, if the profile indicates that the application executing at the second virtual function requires 40% of the world switch cycle interval, the VF manager determines that 40% of the world switch cycle interval is less than the 80% of the world switch cycle interval that is currently available and assigns the second virtual function a time slice that is 40% of the world switch cycle interval. The updated current available budget after the first and second virtual functions have been assigned time slices is 40% of the world switch cycle interval.

In some embodiments, the VF manager defines a minimum time slice based on a ratio of world switch overhead to usable time of the parallel processor. If a profile of an application running at a virtual function requesting a time slice requires less than the minimum time slice to render a frame, the VF manager assigns a time slice that is no shorter than the minimum time slice, if the available budget permits. Thus, if a third virtual function has a profile indicating that the application executing at the third virtual function requires 10% of the world switch cycle interval and the VF manager has defined the minimum time slice as 12.5% of the world switch cycle interval, the VF manager assigns a time slice that is 12.5% of the world switch cycle interval, leaving an available budget of 27.5%.

If a fourth virtual function has a profile indicating that the application executing at the fourth virtual function requires 20% of the world switch cycle interval, the VF manager determines that 20% is within the remaining available budget of 27.5%. However, if the VF manager assigns a time slice that is 20% of the world switch cycle interval to the fourth virtual function, only 7.5% of the world switch cycle interval will remain in the available budget. Because 7.5% of the world switch cycle interval is less than the minimum time slice, the VF manager assigns the fourth virtual function a time slice that is the entire remaining available budget of 27.5% of the world switch cycle interval, as the 7.5% of the world switch cycle interval would otherwise go unassigned.

In the preceding example, all four requesting virtual functions are able to be accommodated by the VF manager, with the first virtual function receiving a time slice that is 20% of the world switch cycle interval, the second virtual function receiving a time slice that is 40% of the world switch cycle interval, the third virtual function receiving a time slice that is 12.5% of the world switch cycle interval, and the fourth virtual function receiving a time slice that is 27.5% of the world switch cycle interval. The time slices assigned to the four virtual functions are not equal in duration, and 90% of the parallel processor capacity is expected to be used, based on the profiles of the applications executing at each of the virtual functions.

In a second example, four virtual functions request time slices at the parallel processor, but only three can be accommodated within the available budget. In the second example, if the available budget is 100% of the world switch cycle interval and the profile of the application executing at the first virtual function indicates that the application requires 20% of the world switch cycle interval to render each frame, the VF manager assigns a time slice that is 20% of the world switch cycle interval to the first virtual function and subtracts the assigned time slice to calculate an updated current available budget of 80% of the world switch cycle interval.

If a second virtual function requesting a time slice at the parallel processor has a profile indicating that the application executing at the second virtual function requires 10% of the world switch cycle interval and the VF manager has defined the minimum time slice as 12.5% of the world switch cycle interval, the VF manager assigns a time slice that is 12.5% of the world switch cycle interval, leaving an available budget of 67.5%.

If a third virtual function requesting a time slice at the parallel processor has a profile indicating that the application executing at the third virtual function requires 60% of the world switch cycle interval and the VF manager has defined the minimum time slice as 12.5% of the world switch cycle interval, the VF manager assigns a time slice that is the entire remaining budget of 67.5% of the world switch cycle interval to the third virtual function. The VF manager assigns more than the 60% of the world switch cycle interval that would accommodate the profile of the application executing at the third virtual function because assigning 60% would leave 7.5% of the world switch cycle interval-which is less than the minimum time slice-unassigned.

In the second example, the first virtual function receives a time slice that is 20% of the world switch cycle interval, the second virtual function receives a time slice that is 12.5% of the world switch cycle interval, and the third virtual function receives a time slice that is 67.5% of the world switch cycle interval, leaving no available budget for the fourth virtual function. Thus, the VF manager declines a request from the fourth virtual function for a time slice at the parallel processor. The time slices assigned to the first three virtual functions are not equal in duration, and 90% of the parallel processor capacity is expected to be used, based on the profiles of the applications executing at each of the virtual functions.

By assigning time slices at the parallel processor to virtual functions based on profiles of applications executing at the virtual functions and an available processing budget of the parallel processor, the VF manager allocates time slices that accommodate the processing requirements of the applications and efficiently uses the processing resources of the parallel processor. The unequal time slices reduce latency and lagging for frames having longer rendering times and reduce unused processing capacity of the parallel processor.

FIG. 1 is a block diagram of a processing system 100 configured to assign time slices at a parallel processor to virtual functions based on profiles of applications executing at the virtual functions and an available budget of the parallel processor in accordance with some embodiments. The processing system 100 includes a central processing unit (CPU) 102 for executing instructions such as draw calls and a parallel processor 106 such as a GPU for performing graphics processing and, in some embodiments, general purpose computing. The processing system 100 also includes a memory 104 such as a system memory, which is implemented as dynamic random access memory (DRAM), static random access memory (SRAM), nonvolatile RAM, or other type of memory. The CPU 102, the parallel processor 106, and the memory 104 communicate over an interface 108 that is implemented using a bus such as a peripheral component interconnect (PCI, PCI-E) bus. However, other embodiments of the interface 108 are implemented using one or more of a bridge, a switch, a router, a trace, a wire, or a combination thereof. The processing system 100 is implemented in devices such as a computer, a server, a laptop, a tablet, a smart phone, and the like.

The CPU 102 executes processes such as one or more applications 132, 134, 136 that generate commands, a user mode driver 116, and other drivers. The applications 132, 134, 136 include applications that utilize the functionality of the parallel processor 106, such as applications that generate work in the processing system 100 or an operating system (OS). Some embodiments of the applications 132, 134, 136 generate commands that are provided to the parallel processor 106 over the interface 108 for execution. For example, the applications 132, 134, 136 can generate commands that are executed by the parallel processor 106 to render a graphical user interface (GUI), a graphics scene, or other image or combination of images for presentation to a user.

Some embodiments of the applications 132, 134, 136 utilize an application programming interface (API) (not shown) to invoke the user mode driver 116 to generate the commands that are provided to the parallel processor 106. In response to instructions from the API, the user mode driver 116 issues one or more commands to the parallel processor 106, e.g., in a command stream or command buffer. The parallel processor 106 executes the commands provided by the API to perform operations such as rendering graphics primitives into displayable graphics images. Based on the graphics instructions issued by applications 132, 134, 136 to the user mode driver 116, the user mode driver 116 formulates one or more graphics commands that specify one or more operations for the parallel processor 106 to perform for rendering graphics. In some embodiments, the applications 132, 134, 136 each have a process that has an instance of the user mode driver 116 that communicates with the guest OS and kernel mode driver to utilize the parallel processor 106.

The processing system 100 comprises multiple virtual machines (VMs), VM(1) 122, VM(2) 124, . . . , VM(N) 126 that are configured in memory 104 on the processing system 100. Resources from physical devices of the processing system 100 are shared with the VMs 122, 124, 126. The resources can include, for example, a graphics processor resource from the parallel processor 106, a central processing unit resource from the CPU 102, a memory resource from memory 104, a network interface resource from a network interface controller, or the like. The VMs 122, 124, 126 use the resources for performing operations on various data (e.g., video data, image data, textual data, audio data, display data, peripheral device data, etc.). In one embodiment, the processing system 100 includes a plurality of resources, which are allocated and shared amongst the VMs 122, 124, 126.

The processing system 100 also includes a hypervisor 110 that is represented by executable software instructions stored in memory 104 and manages instances of VMs 122, 124, 126. The hypervisor 110 is also known as a virtualization manager or virtual machine manager (VMM). The hypervisor 110 controls interactions between the VMs 122, 124, 126 and the various physical hardware devices, such as the parallel processor 106. The hypervisor 110 includes software components for managing hardware resources and software components for virtualizing or emulating physical devices to provide virtual devices, such as virtual disks, virtual processors, virtual network interfaces, or a virtual parallel processor as further described herein for each virtual machine 122, 124, 126. In one embodiment, each virtual machine 122, 124, 126 is an abstraction of a physical computer system and may include an operating system (OS), such as Microsoft Windows® and applications, which are referred to as the guest OS and guest applications, respectively, wherein the term "guest" indicates it is a software entity that resides within the VMs.

The VMs 122, 124, 126 generally are instanced, meaning that a separate instance is created for each of the VMs 122, 124, 126. One of ordinary skill in the art will recognize that a host system may support any number N of virtual machines. As illustrated, the hypervisor 110 provides N virtual machines 122, 124, 126, with each of the guest virtual machines 122, 124, 126 providing a virtual environment wherein guest system software resides and operates. The guest system software includes applications 132, 134, 136 and VF kernel mode drivers (KMDs) (not shown) typically under the control of a guest OS. The VF KMDs control operation of the parallel processor 106 by, for example, providing an API to software (e.g., applications 132, 134, 136) executing on the CPU 102 to access various functionality of the parallel processor 106.

In various virtualization environments, single-root input/output virtualization (SR-IOV) specifications allow for a single Peripheral Component Interconnect Express (PCIe) device (e.g., parallel processor 106) to appear as multiple separate PCIe devices. A physical PCIe device (such as parallel processor 106) having SR-IOV capabilities may be configured to appear as multiple functions. The term "function" as used herein refers to a device with access controlled by a PCIe bus. SR-IOV operates using the concepts of physical functions (PF) and virtual functions (VFs), where physical functions are full-featured functions associated with the PCIe device. A virtual function (VF) is a function on a PCIe device that supports SR-IOV. The VF is associated with the PF and represents a virtualized instance of the PCIe device. Each VF has its own PCI configuration space. Further, each VF also shares one or more physical resources on the PCIe device with the PF and other VFs.

In the example embodiment of FIG. 1, SR-IOV specifications enable the sharing of parallel processor 106 among the virtual machines 122, 124, 126. The parallel processor 106 is a PCIe device having a physical function 128. The virtual functions VF(1) 142, VF(2) 144, . . . , VF(N) 146 are derived from the physical function 128 of the parallel processor 106, thereby mapping a single physical device (e.g., the parallel processor 106) to a plurality of virtual functions 142, 144, 146 that are shared with the guest virtual machines 122, 124, 126. In some embodiments, the hypervisor 110 maps (e.g., assigns) the virtual functions 142, 144, 146 to the guest virtual machines 122, 124, 126. In another embodiment, the hypervisor 110 delegates the assignment of virtual functions 142, 144, 146 to a physical function (PF) driver 120 (also referred to as a host physical driver) of the parallel processor 106. For example, VF(1) 142 is mapped to VM(1) 122, VF(2) 144 is mapped to VM(2) 122, and so forth. The virtual functions 142, 144, 146 appear to the OS of their respective virtual machines 122, 124, 126 in the same manner as a physical parallel processor would appear to an operating system, and thus, the virtual machines 122, 124, 126 use the virtual functions 142, 144, 146 as though they were a hardware device. In some embodiments, the PF driver 120 is implemented at the hypervisor 110. In some embodiments, the PF driver 120 is implemented at the host kernel space or host user mode space (not shown).

Initialization of a VF involves configuring hardware registers of the parallel processor 106. The hardware registers (not shown) store hardware configuration data for the parallel processor 106. A full set of hardware registers is accessible to the physical function 128. The hardware registers are shared among multiple VFs 142, 144, 146 by using context save and restore to switch between and run each virtual function. Therefore, exclusive access to the hardware registers is required for the initializing of new VFs. As used herein, "exclusive access" refers to the parallel processor 106 registers being accessible by only one virtual function at a time during initialization of VFs 142, 144, 146. When a virtual function is being initialized, all other virtual functions are paused or otherwise put in a suspended state where the virtual functions and their associated virtual machines do not consume parallel processor 106 resources. When paused or suspended, the current state and context of the VF/VM are saved to a memory location. In some embodiments, exclusive access to the hardware registers allows a new virtual function to begin initialization by pausing other running functions. After creation, the VF is able to be directly assigned an I/O domain. The hypervisor 110 assigns a VF 142, 144, 146 to a corresponding VM 122, 124, 126 by mapping configuration space registers of the VFs 142, 144, 146 to the configuration space presented to the VM by the hypervisor 110. This capability enables the VF 142, 144, 146 to share the parallel processor 106 and to perform I/O operations without CPU 102 and hypervisor 110 software overhead.

In some embodiments, after a new virtual function finishes initializing, a world switch control 112 triggers world switches between all already active VFs (e.g., previously initialized VFs) which have already finished initialization such that each VF is allocated a time slice on the parallel processor 106 to handle any accumulated commands. In operation, in various embodiments, the world switch control 112 manages time slices for the VFs 142, 144, 146 that share the parallel processor 106. That is, the world switch control 112 is configured to manage time slices by tracking the time slices, stopping work on the parallel processor 106 when a time slice for a VF 142, 144, 146 that is being executed has expired, and starting work for the next VF 142, 144, 146 having the subsequent time slice.

To more efficiently allocate time slices at the parallel processor 106 to the VFs 142, 144, 146, the processing system includes a VF manager 114 to assign time slices based on profiles of the applications 132, 134, 136 executing at each of the respective VFs 142, 144, 146 and an available budget of the parallel processor 106. The VF manager 114 evaluates requests from the VFs 142, 144, 146 for time slices at the parallel processor 106 in the order in which the requests are received. Each request includes a profile (not shown) of the application 132, 134, 136 running at the respective VF 142, 144, 146 indicating a budget requirement of the application. The VF manager 114 determines whether the budget requirement of each application 132, 134, 136 can be accommodated by the available budget of the parallel processor 106. If the parallel processor 106 has sufficient available budget to accommodate the budget requirement of the application, the VF manager 114 assigns a time slice to the virtual function with a duration that is based on the budget requirement of the application.

In some embodiments, the VF manager 114 defines a minimum time slice that is a function of the ratio of switching overhead to usable time of the time slice. If a profile of an application executing at a VF 142, 144, 146 indicates a budget requirement that is less than the minimum time slice and at least the minimum time slice remains in the available budget of the parallel processor 106, the VF manager 114 assigns the VF 142, 144, 146 the minimum time slice. In some embodiments, if a VF 142, 144, 146 requests a time slice at the parallel processor 106 and the remaining available budget is less than the sum of a budget requirement of an application executing at the VF 142, 144, 146 and the minimum time slice, the VF manager 114 assigns a time slice having a duration of the entire remaining available budget to the VF 142, 144, 146.

Figure 2:
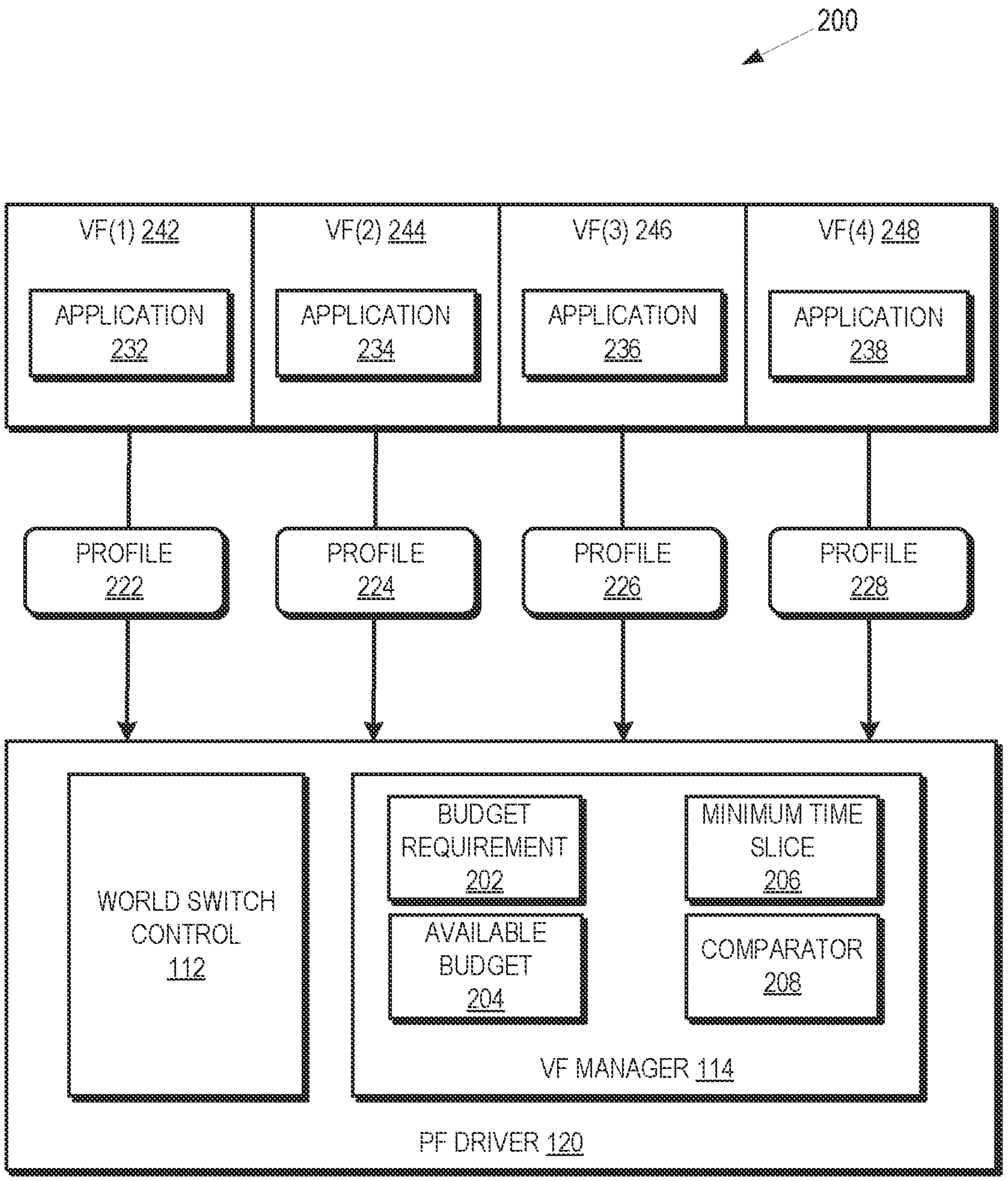
FIG. 2 is a block diagram illustrating a virtual function manager of a physical function driver selectively assigning time slices at a parallel processor to virtual functions in accordance with some embodiments.

FIG. 2 is a block diagram 200 illustrating the VF manager 114 assigning time slices at the parallel processor 106 to virtual functions in accordance with some embodiments. In the illustrated example, application 232 is executing at VF(1) 242, application 234 is executing at VF(2) 244, applications 236 is executing at VF(3) 246, and application 238 is executing at VF(4) 248. Each application has an associated profile indicating the budget requirements for each frame of the application. Thus, application 232 has profile 222, application 234 has profile 224, application 236 has profile 226, and application 238 has profile 228.

The PF driver 120 initializes the VF(1) 142, VF(2) 144, VF(3) 146, VF(4) 148 and receives their corresponding profiles 222, 224, 226, 228. The world switch control 112 sets the world switch cycle interval as a function of the target frame rate of the applications 232, 234, 236, 238 as indicated in their respective profiles 222, 224, 226, 228. For example, if the target frame rate is 60 fps, in some embodiments the world switch control 112 sets the world switch cycle interval as 1000/60 fps=16.67 milliseconds.

The VF manager 114 includes a comparator 208 configured to compare a budget requirement 202 of each application 232, 234, 236, 238 indicated by each profile 222, 224, 226, 228 to a current available budget 204 of the parallel processor 106 and a minimum time slice 206. For each request to assign a time slice to a virtual function, the comparator 208 determines if the budget requirement 202 is less than the available budget 204 and more than the minimum time slice 206. If the budget requirement 202 is less than the available budget 204 and more than the minimum time slice 206, the VF manager 114 assigns the requested time slice budget 202 to the requesting VF. If the budget requirement 202 is less than the available budget 204 and also less than the minimum time slice 206, the VF manager 114 assigns the minimum time slice 206 to the requesting VF.

For example, if VF(1) 242 is the first VF to request a time slice, then the entire world switch cycle interval of 16.67 ms is in the available budget 204. If the profile 222 indicates that the budget requirement 202 of application 232 is 3.33 ms per frame (i.e., approximately 20% of the world switch cycle interval of 16.67 ms) and the minimum time slice is 2 ms per frame (i.e., approximately 12% of the world switch cycle interval), the VF manager 114 assigns a time slice of 3.33 ms, or 20% of the world switch cycle interval, to VF(1) 242.

If VF(2) 244 is the second VF to request a time slice, then approximately 80% of the world switch cycle interval is left in the available budget 204. If the profile 224 indicates that the budget requirement 202 of the application 234 is 1.6 ms per frame (approximately 10% of the world switch cycle interval), the comparator 208 determines that there is sufficient available budget 204 to accommodate VF(2) 244's request. However, because the budget requirement 202 is less than the minimum time slice 206, the VF manager 114 assigns VF(2) 244 a time slice of the minimum time slice 206 duration of 2 ms, or approximately 12% of the world switch cycle interval, leaving an available budget 204 of 68% of the world switch cycle interval.

If VF(3) 246 is the third VF to request a time slice and the profile 226 indicates that the budget requirement 202 of the application 236 is 6.5 ms per frame, or approximately 39% of the world switch cycle interval, the comparator 208 determines that the available budget 204 of 68% can accommodate VF(3) 246 and that the budget requirement 202 exceeds the minimum time slice 206. The VF manager 114 therefore assigns VF(3) 246 a time slice having a duration of 6.5 ms, or 39% of the world switch cycle interval, leaving an available budget 204 of 29% of the world switch cycle interval.

The fourth VF to request a time slice is VF(4) 248. The profile 228 indicates that the budget requirement 202 of the application 238 is 3.33 ms per frame, or approximately 20% of the world switch cycle interval. The comparator 208 determines that the available budget of 29% of the world switch cycle interval can accommodate VF(4) 248. However, the remaining available budget 204 would be less than the minimum time slice 206 if the VF manager 114 assigns a time slice having a duration of 3.33 ms per frame. To avoid leaving a portion of the world switch cycle interval unassigned, in some embodiments the VF manager 114 assigns VF(4) 248 a time slice having a duration of 4.84 ms, or the remaining available budget 204 of 29% of the world switch cycle interval.

Figure 3:
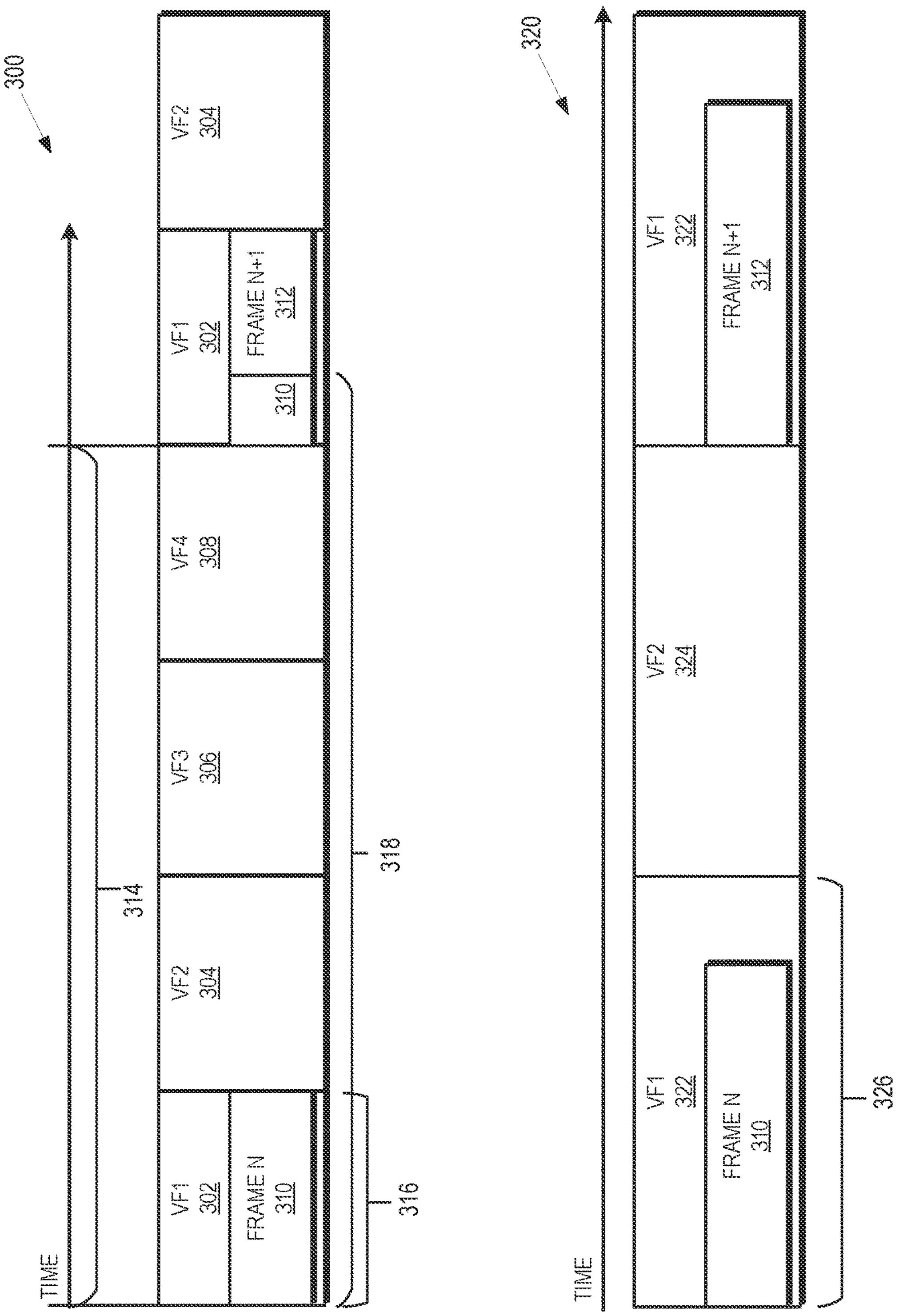
FIG. 3 (PRIOR ART)
FIG. 3 illustrates cross-frame inconsistency and underutilization of a parallel processor by multiple virtual functions.

FIG. 3 illustrates cross-frame inconsistency and underutilization of a parallel processor by multiple virtual functions. In example 300, a world switch cycle interval 314 is evenly divided among four VFs: VF1 is assigned time slice 302, VF2 is assigned time slice 304, VF3 is assigned time slice 306, and VF4 is assigned time slice 308. In the illustrated example, the world switch cycle interval 314 is 16.67 ms, each time slice 302, 304, 306, 308 has a duration 316 of 4.167 ms, and the applications running on the VFs are held to a maximum of 60 fps. VF1 is running an application with frames that require approximately 6 ms to render at the parallel processor 106, which is longer than the assigned time slice 302 of 4.167 ms. Accordingly, a frame N 310 is not able to be fully rendered in a single time slice 302 and must wait until VF1 regains the time slice after a full world switch cycle interval 314 to complete rendering. Once frame N 310 completes rendering, a next frame N+1 312 begins rendering, but is likewise unable to complete rendering in a single time slice 302. Rendering the frame N 310 takes a time 318, resulting in lagging and a frame rate that is less than 60 fps.

In example 320, the same world switch cycle interval 314 is evenly divided among two VFs: VF1 is assigned time slice 322, and VF2 is assigned time slice 324. Thus, each time slice 322, 324 has a duration 326 of 8.34 ms. In a two-VF configuration, the parallel processor 106 is able to complete rendering frame N 310 for VF1 in a single time slice 322. However, because the duration 326 of the time slice 322 is greater than the time the rendering time for the time slice 322 and the application is held to a maximum frame rate of 60 fps, the parallel processor 106 experiences idle cycles in each time slice. Thus, equal time slice assignments can result in increased latency, as illustrated in example 300, and in underutilization of the parallel processor 106, as illustrated in example 320.

Figure 4:
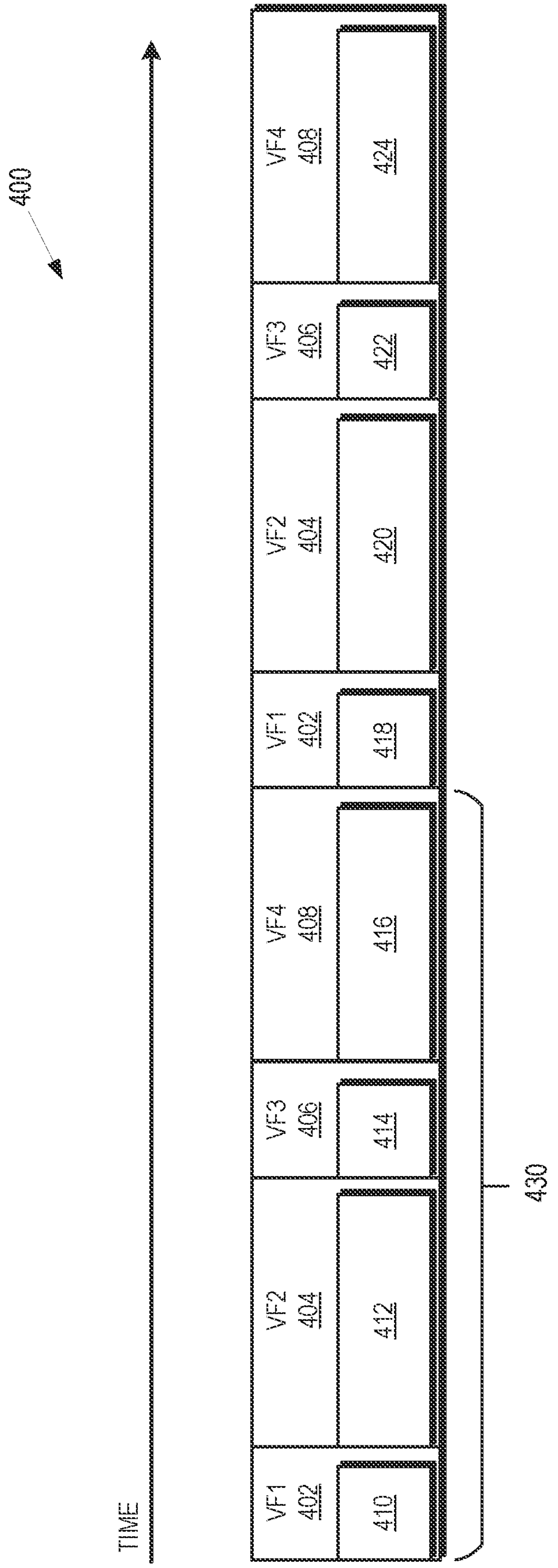
FIG. 4 is an illustration of unequal time slices assigned to multiple virtual functions for cross-frame consistency and increased utilization of a parallel processor in accordance with some embodiments.

FIG. 4 is an illustration 400 of unequal time slices assigned to multiple virtual functions for cross-frame consistency and increased utilization of a parallel processor in accordance with some embodiments. In the illustrated example, a world switch cycle interval 430 is unevenly divided among four VFs based on the profiles of applications executing at each of the VFs. VF1 and VF3 are running applications that have profiles indicating a relatively small budget requirement (e.g., 15% of the world switch cycle interval 430), while VF2 and VF4 are running applications that have profiles indicating a relatively large budget requirement (e.g., 35% of the world switch cycle interval 430).

Accordingly, the VF manager 114 assigns VF1 and VF3 time slices 402, 406 that are each approximately 15% of the world switch cycle interval 430, and assigned VF2 and VF4 time slices 404, 408 that are each approximately 35% of the world switch cycle interval 430. During time slice 402, the parallel processor 106 renders frame 410 for VF1. During time slice 404, the parallel processor renders frame 412 for VF2. During time slice 406, the parallel processor renders frame 414 for VF3, and during time slice 408, the parallel processor renders frame 416 for VF4. Because each time slice is tailored to the budget requirements of the applications executing at the VFs, the parallel processor 106 completes rendering each frame within the assigned time slices. Thus, in the next world switch cycle interval, the parallel processor renders frame 418 for VF1, frame 420 for VF2, frame 422 for VF3, and frame 424 for VF4. With one frame being rendered per world switch cycle interval, the applications are able to maintain a steady frame rate (e.g., 60 fps). Additionally, the full capacity of the parallel processor 106 during world switch cycle interval 430 is used by the VFs.

Figure 5:
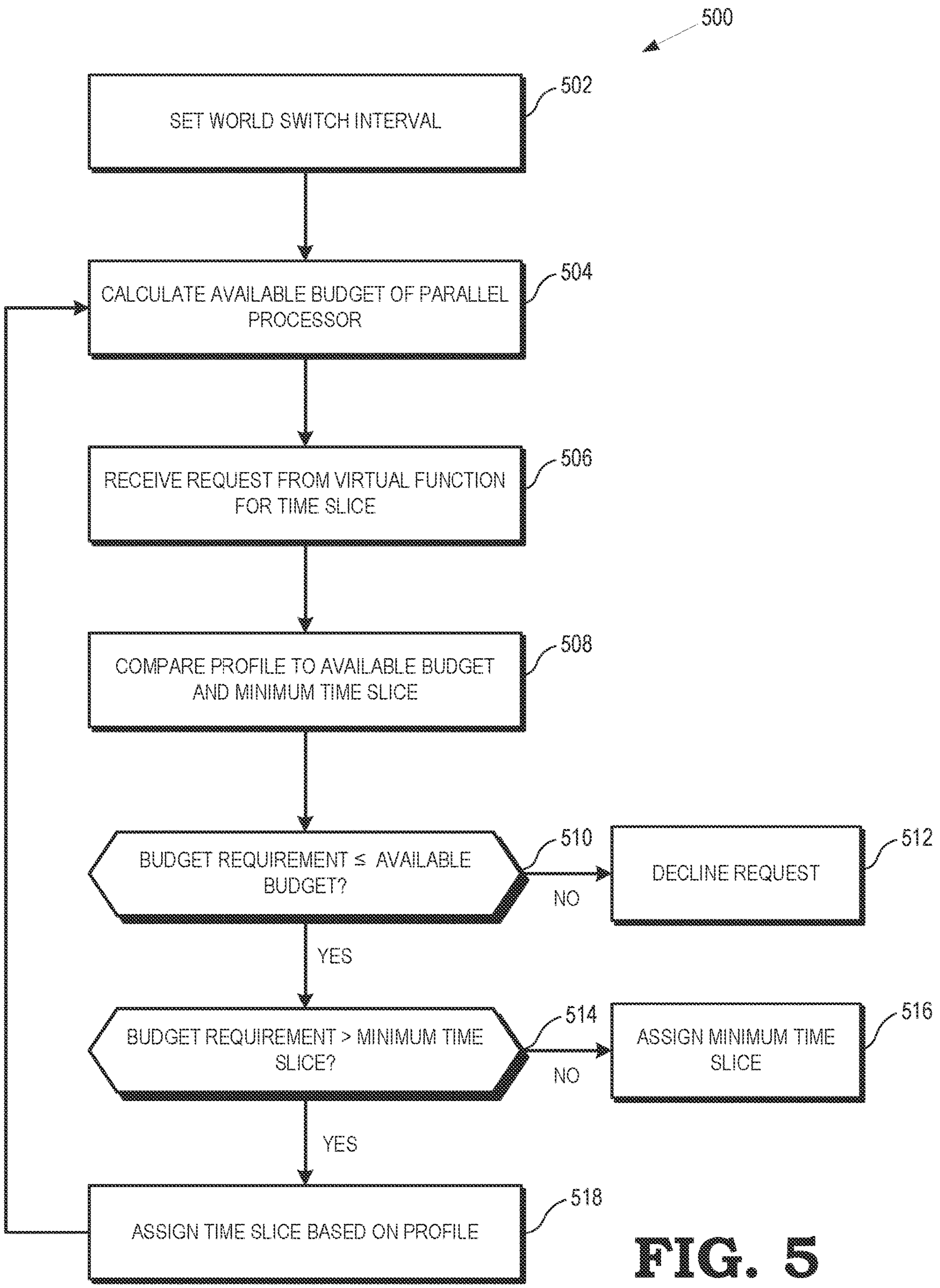
FIG. 5 is a flow diagram illustrating a method for assigning time slices at a parallel processor to virtual functions based on profiles of applications executing at the virtual functions and an available budget of the parallel processor in accordance with some embodiments.

FIG. 5 is a flow diagram illustrating a method 500 for assigning time slices at a parallel processor to virtual functions based on profiles of applications executing at the virtual functions and an available budget of the parallel processor in accordance with some embodiments. Although the operations of FIG. 5 are described with respect to the system of FIGS. 1-2, it should be appreciated that the method 500, performed by any like system, with steps as illustrated or any other feasible order, falls within the scope of the present disclosure.

The method flow begins at block 502, at which the world switch control 112 sets the world switch cycle interval based on the number of virtual functions initialized at the parallel processor 106 and the target frame rate of the applications. At block 504, the VF manager 114 calculates an available budget 204 of the parallel processor 106.

At block 506, the VF manager 114 receives a request from a virtual function for a time slice at the parallel processor 106. At block 508, the VF manager 114 compares a budget requirement 202 indicated by a profile 222 of an application 232 executing at the virtual function (e.g., VF(1) 242) to the available budget 204. At block 510, the comparator 208 determines if the budget requirement 202 is less than the available budget 204. If the budget requirement exceeds the available budget 204, the method flow continues to block 512. At block 512, the VF manager 114 declines the request to assign a time slice to the VF.

If, at block 510, the comparator determines that the budget requirement 202 is less than the available budget 204, the method flow continues to block 514. At block 514, the comparator 208 determines if the budget requirement 202 is greater than the minimum time slice 206. If, at block 514, the comparator 208 determines that the budget requirement 202 is not greater than the minimum time slice 206, the method flow continues to block 516. At block 516, the VF manager 114 assigns the VF a minimum time slice. If, at block 514, the comparator 208 determines that the budget requirement 202 is greater than the minimum time slice 206, the method flow continues to block 518. At block 518, the VF manager 114 assigns the VF a time slice having a duration based on the budget requirement 202 indicated by the profile 222.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

selectively assigning a first time slice that is at least a minimum duration at a parallel processor to a first virtual function based on a current available budget of the parallel processor and a profile of a first application executing at the first virtual function, the profile including a parallel processor budget requirement of the first application, the selectively assigning comprising comparing the parallel processor budget requirement to a minimum time slice duration;

updating the current available budget; and selectively assigning a second time slice at the parallel processor to a second virtual function based on the updated current available budget and a profile of a second application executing at the second virtual function.

2. The method of claim 1, wherein a duration of the first time slice differs from a duration of the second time slice.

3. The method of claim 1, wherein the current available budget of the parallel processor is a world switch cycle interval minus a sum of assigned time slices.

4. The method of claim 1, wherein the profile of the first application comprises the parallel processor budget requirement of the first application and the profile of the second application comprises a parallel processor budget requirement of the second application.

5. The method of claim 4, wherein selectively assigning comprises assigning the second time slice in response to the updated current available budget exceeding the parallel processor budget requirement of the second application.

6. A method comprising:

selectively assigning a first time slice at a parallel processor to a first virtual function based on a current available budget of the parallel processor and a profile of a first application executing at the first virtual function, wherein the first time slice has at least a minimum duration is based on a ratio of world switch overhead to usable time of the parallel processor;

updating the current available budget; and selectively assigning a second time slice at the parallel processor to a second virtual function based on the updated current available budget and a profile of a second application executing at the second virtual function.

7. A method comprising:

assigning time slices at a parallel processor to a plurality of virtual functions, wherein a duration of each time slice is selectively assigned based on a current available budget of the parallel processor and a profile of an application executing at each of the virtual functions, the profile including a parallel processor budget requirement of the application, wherein the assigning comprises comparing the parallel processor budget requirement to a minimum time slice duration and based on the comparison, setting each assigned time slice to a duration that is at least the minimum time slice duration; and updating the current available budget in response to assigning the time slices.

8. The method of claim 7, wherein a duration of a first time slice of the time slices differs from a duration of a second time slice of the time slices.

9. The method of claim 7, wherein the available budget of the parallel processor is a world switch cycle interval minus a sum of assigned time slices.

10. The method of claim 7, further comprising:

declining a request from a virtual function for a time slice in response to the parallel processor budget requirement of the application executing at the virtual function exceeding the available budget of the parallel processor.

11. The method of claim 7, wherein the duration of each time slice is not less than the minimum duration.

12. A method comprising:

assigning time slices at a parallel processor to a plurality of virtual functions, wherein a duration of each time slice is assigned based on a profile of an application executing at each of the virtual functions, the profile including a parallel processor budget requirement of the application and an available budget of the parallel processor, wherein each assigned time slice has at least a minimum duration based on a ratio of world switch overhead to usable time of the parallel processor.

13. A device comprising:

a parallel processor configured to execute requests from virtual functions; and a virtual function manager configured to selectively assign time slices at the parallel processor to a plurality of virtual functions, wherein a duration of each time slice is based on a current available budget of the parallel processor and a profile of an application executing at each of the virtual functions, the profile including a parallel processor budget requirement of the application;

wherein the virtual function manager is configured to compare the parallel processor budget requirement to a minimum time slice duration to ensure each assigned time slice has a duration that is at least the minimum time slice duration; and wherein the virtual function manager is further configured to update the current available budget in response to the assigned time slices.

14. The device of claim 13, wherein a duration of a first time slice of the time slices differs from a duration of a second time slice of the time slices.

15. The device of claim 13, wherein the available budget of the parallel processor is a world switch cycle interval minus a sum of assigned time slices.

16. The device of claim 13, wherein the virtual function manager is further configured to:

decline a request from a virtual function for a time slice in response to the parallel processor budget requirement of the application executing at the virtual function exceeding the available budget of the parallel processor.

17. The device of claim 13, wherein the duration of each time slice is not less than the minimum duration.

18. A method comprising:

selectively assigning a first time slice at a parallel processor to a first virtual function based on a profile of a first application executing at the first virtual function and a current available budget of the parallel processor, wherein a maximum duration of the current available budget is defined as 100% of a world switch cycle interval;

updating the current available budget; and selectively assigning a second time slice at the parallel processor to a second virtual function based on the updated current available budget and a profile of a second application executing at the second virtual function.

* * * * *